(12) United States Patent
Zhang (10) Patent No.: US 7,330,331 B2
(45) Date of Patent: Feb. 12, 2008

(54) REPEATABLE RUNOUT ESTIMATION IN A NOISY POSITION ERROR SIGNAL ENVIRONMENT

(75) Inventor: Tao Zhang, Shakopee, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 612 days.

(21) Appl. No.: 10/455,029

(22) Filed: Jun. 5, 2003

(65) Prior Publication Data

US 2004/0246619 A1 Dec. 9, 2004

Related U.S. Application Data

(63) Continuation-in-part of application No. 10/277,768, filed on Oct. 22, 2002, now Pat. No. 6,847,503.

(51) Int. Cl.
G11B 5/596 (2006.01)
G11B 21/02 (2006.01)
G11B 5/55 (2006.01)

(52) U.S. Cl. ............... 360/77.04; 360/75; 360/78.09

(58) Field of Classification Search ............ 360/48, 360/75, 77.01, 77.02, 77.08, 78.04, 78.09; 700/32, 78, 44, 45, 54, 55
See application file for complete search history.

(56) References Cited

U.S. PATENT DOCUMENTS

| | | | |
|---|---|---|---|
| 5,550,685 A | 8/1996 | Drouin | |
| 5,923,491 A * | 7/1999 | Kisaka et al. | 360/77.04 |
| 5,978,169 A | 11/1999 | Woods | |
| 6,069,764 A | 5/2000 | Morris et al. | |
| 6,115,203 A | 9/2000 | Ho et al. | |
| 6,292,324 B1 | 9/2001 | Ho et al. | |
| 6,310,742 B1 | 10/2001 | Nazarian et al. | |
| 6,377,417 B1 * | 4/2002 | Ahn | 360/77.04 |
| 6,545,835 B1 * | 4/2003 | Codilian et al. | 360/77.04 |
| 6,549,362 B1 | 4/2003 | Melrose et al. | |
| 6,563,663 B1 | 5/2003 | Bi et al. | |
| 6,654,197 B1 * | 11/2003 | Ho | 360/77.04 |
| 6,847,503 B2 * | 1/2005 | Zhang et al. | 360/77.04 |
| 6,950,273 B2 * | 9/2005 | Nakagawa et al. | 360/78.14 |
| 2001/0036033 A1 | 11/2001 | Baumann et al. | |
| 2001/0038507 A1 | 11/2001 | Szita | |
| 2001/0048570 A1 | 12/2001 | AbouJaoude et al. | |
| 2002/0039248 A1 | 4/2002 | Liu et al. | |

OTHER PUBLICATIONS

Robert A. Meyers, "Control Systems Feedback," Encyclopedia of Physical Science and Technology, 2nd ed., Academic Press Limited (London), p. 457-461, (Jun. 4, 1992).
Robert A. Meyers, "Navigation, Inertial," Encyclopedia of Physical Science and Technology, 2nd ed., Academic Press Limited (London), p. 620-624, (Jun. 4, 1992).

* cited by examiner

Primary Examiner—William Korzuch
Assistant Examiner—Jason Olson
(74) Attorney, Agent, or Firm—Westman, Champlin & Kelly (57) ABSTRACT

A system and method for estimating repeatable runout in a servo control system, such as a disc drive servo loop, is provided. The system includes a Kalman filter that is configured to receive position error signals from the servo control system and to estimate the repeatable runout in the position error signals.

20 Claims, 6 Drawing Sheets

REPEATABLE RUNOUT ESTIMATION IN A NOISY POSITION ERROR SIGNAL ENVIRONMENT

The present application claims priority from, and is a Continuation-In-Part of, U.S. patent application Ser. No. 10/277,768 for Zhang et al. entitled REPEATABLE RUNOUT COMPENSATION IN A DISC DRIVE, filed Oct. 22, 2002, now U.S. Pat. No. 6,847,503, and assigned to the assignee of the present invention.

FIELD OF THE INVENTION

The present invention relates generally to servo control systems. In particular, the present invention relates to estimating repeatable runout in a servo control system, such as a disc drive servo control loop.

BACKGROUND OF THE INVENTION

Servo control systems that maintain the position of read/write heads relative to tracks on discs in disc drives, for example, are well known. To provide proper position control, such servo systems generate position error signals (PES) indicative of the position of the heads from servo information that is written to the discs during the manufacturing of the disc drive. In response to the detected position, the servo system outputs current to an actuator motor (such as a voice coil motor, or VCM) utilized to pivot an actuator assembly that moves the heads across the disc surfaces.

It is a continuing trend in the disc drive industry to provide successive generations of disc drive products with ever increasing data storage capacities and data transfer rates. Because the amount of disc surface area available for the recording of data remains substantially constant (or even decreases as disc drive form factors become smaller), substantial advancements in areal recording densities, both in terms of the number of bits that can be recorded on each track as well as the number of tracks on each disc, are continually being made in order to facilitate such increases in data capacity.

The servo information used to define the tracks is written during disc drive manufacturing using a highly precise servo track writer. While the tracks are intended to be concentric, uncontrolled factors such as bearing tolerances, spindle resonance modes, misalignment of the discs and the like tend to introduce errors in the location of the servo information. Each track is thus typically not perfectly concentric, but rather exhibits certain random, repeatable variations which are sometimes referred to as written-in repeatable runout, or WI-RRO. In addition to the WI-RRO, repeatable disturbance in a disc drive also occurs due to an unbalanced spindle, for example. The WI-RRO and other repeatable disturbances are collectively referred to as repeatable runout (RRO). RRO appears as a component of the PES. Another component of the PES called non-repeatable runout (NRRO) occurs due to non-repeatable disturbances such as resonance modes, disc flutter, windage, disc vibrations, etc. RRO has a constant period determined by the spindle speed of the disc drive, and NRRO is random, but with consistent probability distributions on different tracks of discs of the disc drive.

While RRO has previously had a minimal impact upon the operation of the disc drive servo system, RRO has an increasingly adverse affect as higher track densities are achieved. Particularly, RRO can ultimately lead to an upper limit on achievable track densities, as RRO cuts into the available track misalignment budget and reduces the range over which the servo system can provide stable servo control. Therefore, relatively accurate RRO measurements need to be carried out for PES analysis during the manufacture of disc drives with high track densities.

Techniques for measuring or estimating RRO usually determine RRO values for sectors of each track by averaging the PES for sectors of each track over several disc revolutions. Since NRRO is also present in the PES, and since the NRRO may be relatively large before the head properly settles over a track, such an averaging technique may produce inaccurate results.

Embodiments of the present invention provide solutions to these and other problems, and offer other advantages over the prior art.

SUMMARY OF THE INVENTION

Disclosed are apparatus and methods for estimating repeatable runout in a servo control system, such as a disc drive servo loop. The system includes a Kalman filter that is configured to receive position error signals from the servo control system and to estimate the repeatable runout in the position error signals.

Other features and benefits that characterize embodiments of the present invention will be apparent upon reading the following detailed description and review of the associated drawings.

DETAILED DESCRIPTION OF ILLUSTRATIVE EMBODIMENTS

In the embodiments described below, an apparatus and method are provided for estimating repeatable runout in a servo control system, such as disc drive servo loop. The estimation of repeatable runout is carried out by a Kalman filter that receives position error signals from the servo control system and estimates the repeatable runout in the position error signals.

Figure 1:
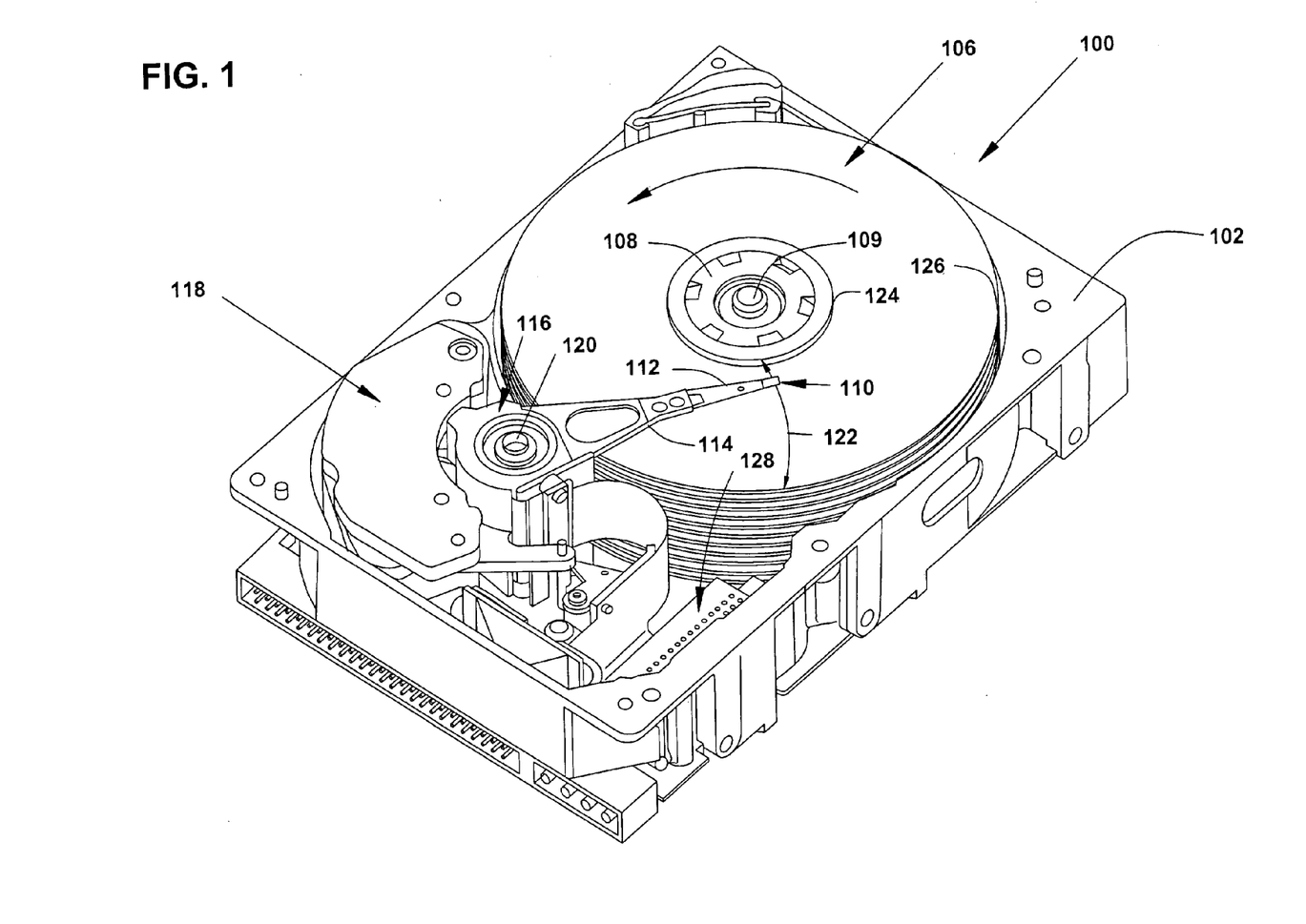
FIG. 1 is a perspective view of a disc drive.

Referring now to FIG. 1, a perspective view of a disc drive 100 with which the present invention is useful is shown. The same reference numerals are used in the various figures to represent the same or similar elements. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs which are mounted for co-rotation about central axis 109.

Each disc surface has an associated slider 110 which is mounted in disc drive 100 and carries a read/write head for communication with the disc surface. In the example shown in FIG. 1, sliders 110 are supported by suspensions 112 which are in turn supported by track accessing arms 114 of an actuator 116. The actuator shown in FIG. 1 is of the type known as a rotary moving coil actuator and includes a voice coil motor (VCM), shown generally at 118. Other types of actuators can be used, such as linear actuators.

Voice coil motor 118 rotates actuator 116 with its attached sliders 110 about a pivot shaft 120 to position sliders 110 over a desired data track along a path 122 between a disc inner diameter 124 and a disc outer diameter 126. Voice coil motor 118 operates under the control of a closed-loop servo controller within internal circuitry 128 based on position information, which is stored on one or more of the disc surfaces within dedicated servo fields. The servo fields can be interleaved with data sectors on each disc surface or can be located on a single disc surface that is dedicated to storing servo information. As slider 110 passes over the servo fields, the read/write head generates a readback signal, which in turn is used to generate position error signals (PES) that identify the location of the head relative to the center line of the desired track. Based on the PES, actuator 116 moves suspension 112 to adjust the head's position so that it moves toward the desired position. Once the transducing head is appropriately positioned, servo controller 128 then executes a desired read or write operation.

Figure 2:
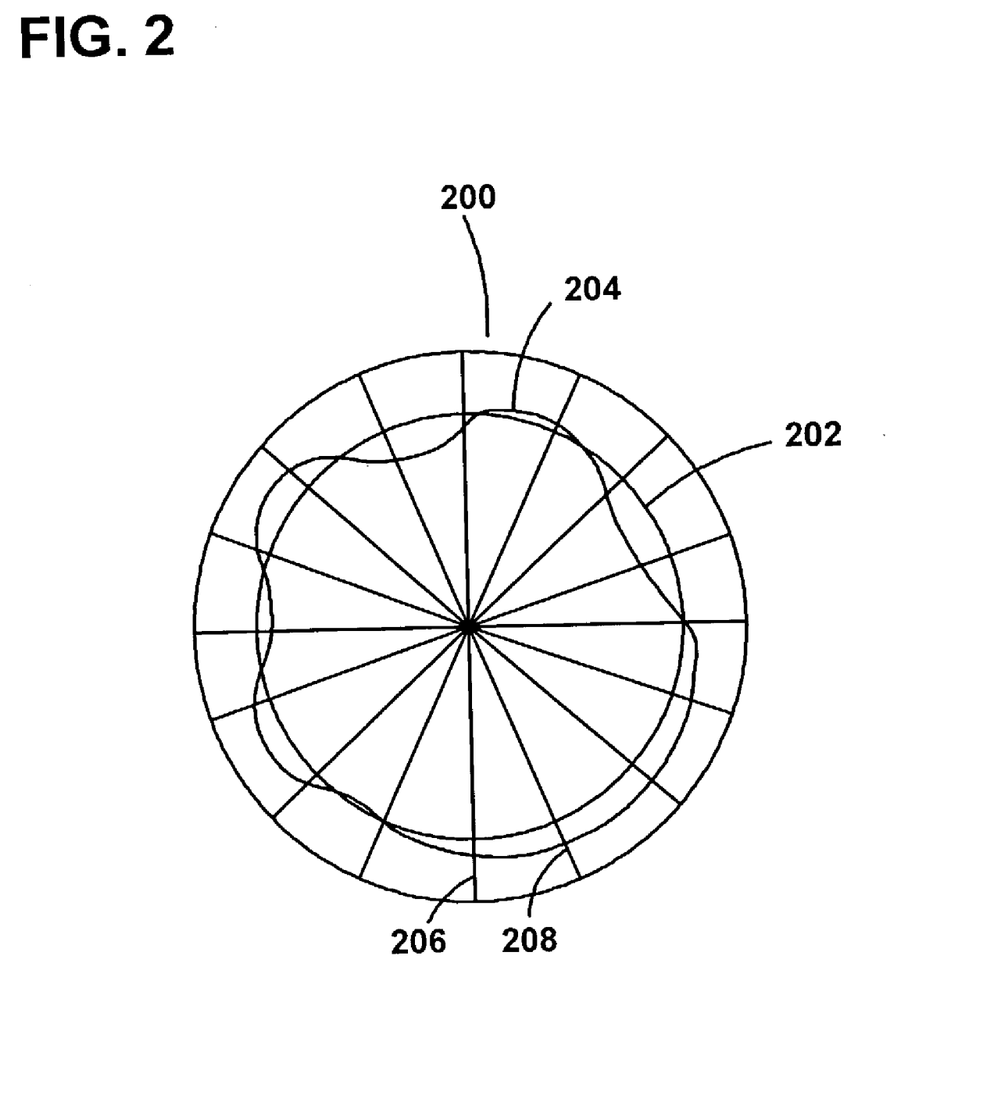
FIG. 2 is a top view of a section of a disc showing an ideal track and a realized written-in track.

Referring now to FIG. 2, a top view of a section 200 of a disc with an ideal, perfectly circular track 202 and an actual track 204 is shown. Section 200 includes a plurality of radially extending servo fields such as servo fields 206 and 208. The servo fields include servo information that identifies the location of actual track 204 along disc section 200.

Any variation in the position of a head away from circular track 202 is considered a position error. The portions of track 204 that do not follow circular track 202 create written-in repeatable runout (WI-RRO) position errors. Track 204 creates WI-RRO errors because each time a head follows the servo fields that define track 204, it produces the same position errors relative to ideal track 202. Further, as noted above, in addition to the WI-RRO, repeatable disturbance also occurs due to an unbalanced spindle, for example. The WI-RRO and other repeatable disturbances are collectively referred to as repeatable runout (RRO).

As mentioned above, techniques for measuring RRO usually determine RRO values for sectors of each track by averaging the PES for sectors of each track over several disc revolutions. A commonly used formula for computing RRO by averaging PES is as follows:

$$RRO(n) = \frac{1}{n}[PES(n) + PES(n-1) + PES(n-2) + \ldots + PES(1)] \quad \text{Equation 1}$$

where $RRO(n)$ is the resulting RRO for a particular track after collecting PES for sectors of the track over n disc revolutions; $PES(n)$ is a vector of PES collected for sectors of the track during the $n^{th}$ disc revolution; $PES(n-1)$ is a vector of PES collected for sectors of the track during the $(n-1)^{th}$ disc revolution, etc. Theoretically, the estimated RRO (n) (Equation 1) converges to the true RRO value when PES is collected for each track over an infinite number of disc revolutions (n approaches infinity). However, in practice, the PES data for each track is usually collected over only about 5-10 disc revolutions in many applications. Experiments have shown that when the amount of PES data collected is not sufficiently large, the averaging scheme for RRO computation (Equation 1) may produce erroneous results. This is especially true when the non-repeatable runout (NRRO) to RRO ratio is high in the servo system.

Under the present invention, instead of employing a PES averaging technique for RRO calculation (such as the technique described in connection with Equation 1), RRO estimation is carried out using a Kalman filter that is configured to receive PES form the servo control system and to estimate the repeatable runout in the PES. For reasons provided further below, this Kalman filter technique minimizes or reduces the time required to carry out relatively accurate RRO estimation.

Figure 3:
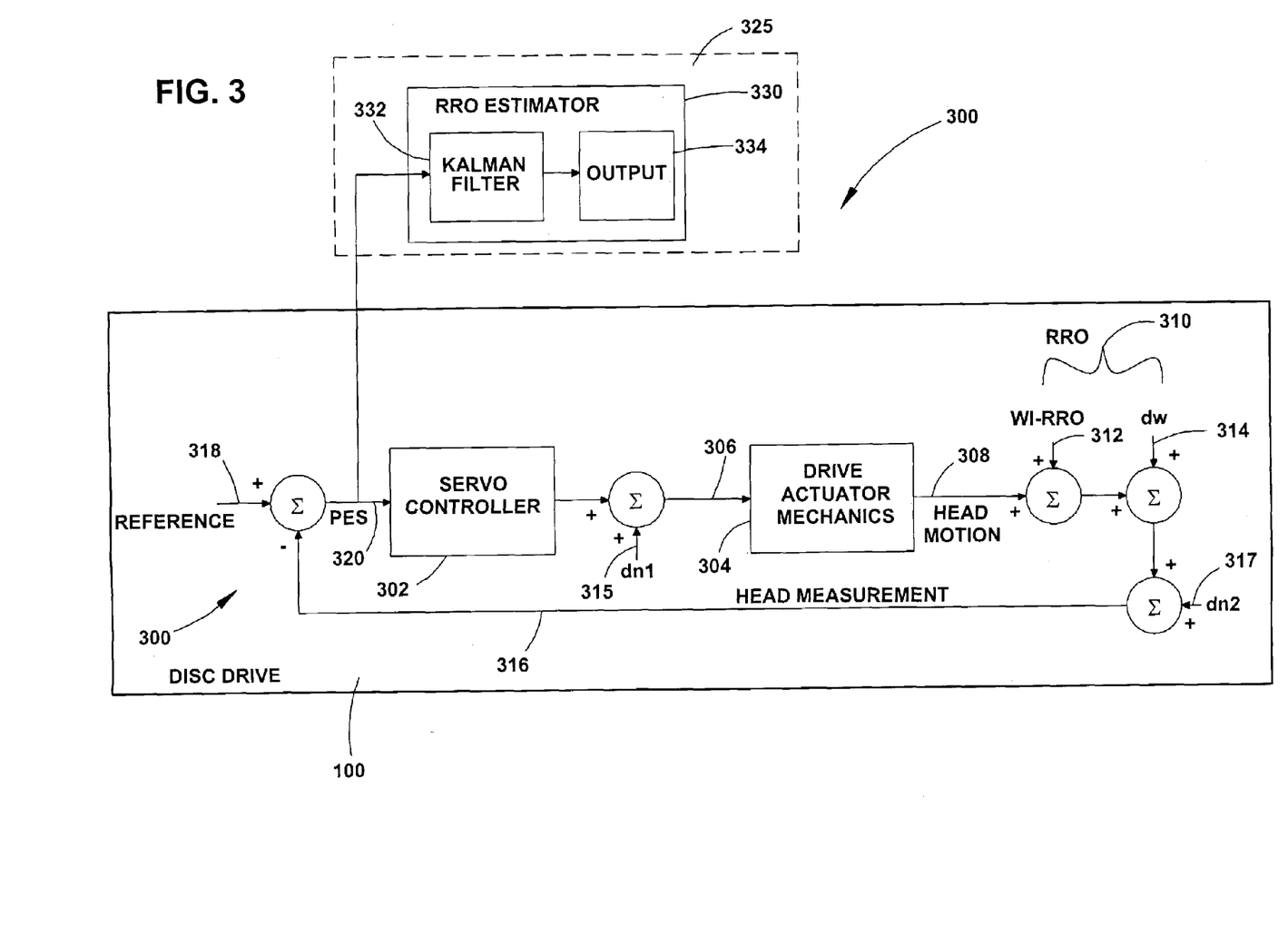
FIG. 3 is a simplified block diagram of a disc drive servo loop coupled to a RRO estimator of the present invention.

Referring now to FIG. 3, a simplified block diagram of a servo loop 300 of a disc drive 100 connected to a manufacturing system 325, which includes a RRO estimator 330 of the present invention, is shown. Servo loop 300 includes servo controller 302 and disc drive actuator mechanics 304. Servo controller 302 is the servo controller circuitry within internal circuit 128 of FIG. 1. Drive actuator mechanics 304 includes actuator assembly 116, voice coil motor 118, track accessing arm 114, suspension 112, and sliders 110, all of FIG. 1.

Servo controller 302 generates a control current 306 that drives the voice coil motor of drive actuator 304. In response, the drive actuator 304 produces head motion 308. In FIGS. 3-1, RRO 310 is shown separately even though the RRO would otherwise appear implicitly in head motion 308. The separation of RRO from head motion 308 provides a better understanding of the present invention. RRO 310 includes WI-RRO 312 and repeatable disturbances $d_W$ at 314, which are located at harmonic frequencies due to disc motion or motor vibrations. In addition, noise in the servo system has been separated and shown as a first noise component dn1 at 315, which represents non-repeatable torque disturbances, such as windage, and a second noise component dn2 at 317, which represents analog to digital converter noise, electronic noise, etc. The combination of these signals results in the head's servo measurement signal, represented by reference numeral 316. Servo measurement signal 316 is subtracted from a reference signal 318, which is generated by internal circuitry 128 based on a desired location of the head. Subtracting head measurement 316 from reference signal 318 produces PES 320, which is input to servo controller 302.

During manufacture, after servo writing is carried out, the disc drive is operated in a test environment with RRO estimator 330 coupled to servo loop 300. RRO estimator 330 carries out a relatively rapid and accurate estimation of RRO 310 in PES 320. As can be seen in FIG. 3, RRO estimator 330 includes a Kalman filter module 332 and an output 334. Kalman filer 332 carries out the RRO estimation and provides estimated RRO values to output 334, which may be a display unit, for example. In some embodiments, output 334 may include a memory in which estimated RRO values are stored. The RRO output may be provided in micro inches relative to or from a track center line, as a percentage of track pitch, etc. A discussion of the suitability of Kalman filters for RRO estimation is provided below. Also provided are descriptions of a general Kalman filter algorithm and a specific example Kalman filter type algorithm that can be utilized in module 332.

Evaluation of disc drive servo loop performance depends in part on how accurately the RRO in the PES is estimated. From the viewpoint of a stochastic process, RRO can be considered as a deterministic signal corrupted by a normally distributed random signal, which is the NRRO. It is therefore possible to use a stochastic estimation technique to develop a RRO estimator. A good estimator should fully utilize the knowledge of the system, for example, the statistical description of process noises. The Kalman filter is one of the best estimators for a statistical state estimation problem. The Kalman Filter is a well-known algorithm developed by R. E. Kalman in 1960. It is a recursive technique of obtaining the solution to a least squares fit. Given only the mean and standard deviation of noises, the Kalman filter is the best linear estimator. The Kalman filter considers a stochastic process governed by the linear stochastic difference Equations 2A-2B:

$$x(n)=Ax(n-1)+Bu(n)+w(n-1) \qquad \text{Equation 2A}$$

$$z(n)=Cx(n)+v(n) \qquad \text{Equation 2B}$$

where x(n) is the system state; z(n) is the output measurement; u(n) is the input of the process; A, B, C represent the process dynamic model; the random variables w and v represent the process and measurement noise, respectively. In addition, w and v are assumed to be independent and with normal probability distributions $$p(w) \sim N(0,Q) \qquad \text{Equation 3A}$$

$$p(v) \sim N(0,R) \qquad \text{Equation 3B}$$

with constants Q and R being the process noise covariance and measurement noise covariance, respectively. The Kalman estimation problem is to design an observer to estimate the state x(n) using the noise corrupted measurement data z(n). The Kalman filter is a recursive optimal state estimator that has the following form $$K(n) = \frac{AP(n-1)A^T}{CAP(n-1)A^T C^T + R}$$

$$\hat{x}(n)=A\hat{x}(n-1)+Bu(n)+K(n)\{z(n)-C[A\hat{x}(n-1)+Bu(n)]\} \qquad \text{Equation 5}$$

$$P(n)=[I-K(n)C][AP(n-1)A^T+Q] \qquad \text{Equation 6}$$

Where $\hat{x}(n)$ is the estimate of x(n); K(n) is the estimator gain; P(n) is called the state estimation error covariance.

For the RRO estimation problem, RRO can be considered as a state of a linear stochastic process $$RRO(n)=RRO(n-1) \qquad \text{Equation 7A}$$

$$PES(n)=RRO(n)+NRRO(n) \qquad \text{Equation 7B}$$

Comparing Equation 7 with Equation 2, it can be seen that by choosing:

$$A=1, B=0, C=1 \qquad \text{Equation 8A}$$

$$w(n)=0, v(n)=NRRO(n) \qquad \text{Equation 8B}$$

$$x(n)=RRO(n), z(n)=RRO(n)+NRRO(n) \qquad \text{Equation 8C}$$

Equation 7 can be viewed as a special class of stochastic process described in Equation 2. Hence, from Equations 4-8 it follows that a Kalman filter type of RRO estimation algorithm is:

RRO estimator gain:

$$K(n) = \frac{P(n-1)}{P(n-1)+R} \qquad \text{Equation 9}$$

Estimation of the RRO:

$$\hat{x}(n)=[1-K(n)]\hat{x}(n-1)+K(n)PES(n) \qquad \text{Equation 10}$$

RRO estimation error covariance:

$$P(n)=[1-K(n)]P(n-1) \qquad \text{Equation 11}$$

where PES(n) is the $n^{th}$ revolution of PES. It follows from Equation 9 that when the NRRO covariance R is large, the estimator gain K(n) becomes small. This implies that when more NRRO noise is corrupted in the PES, less confidence is had in the RRO information provided by PES. The estimator will place a small weight K(n) on the measured PES for the RRO estimate, and will set a large weight 1−K(n) on the previous $\hat{x}(n-1)$ estimate.

Let $\hat{x}(n)$ be the estimate of RRO at n-th revolution of PES. It follows from Equation 1 that $$\hat{x}(n-1) = \frac{1}{n-1}[PES(n-1) + PES(n-2) + \ldots + PES(1)] \qquad \text{Equation 12}$$

$$\hat{x}(n) = \frac{1}{n}[PES(n) + PES(n-1) + PES(n-2) + \ldots + PES(1)] \qquad \text{Equation 13}$$

Equation 1 can be further expressed in a recursive form as:

$$\hat{x}(n) = \frac{1}{n}[PES(n) + (n-1)\hat{x}(n-1)] \qquad \text{Equation 14}$$

$$= \left(1 - \frac{1}{n}\right)\hat{x}(n-1) + \frac{1}{n}PES(n)$$

By comparing Equation 14 and the new RRO estimation algorithm described by Equation 10, it is seen that the RRO estimator described by Equation 1 is a special form of the new RRO estimation algorithm described by Equation 10 with K(n)=1/n. Substituting Equation 9 into Equation 11 leads to:

$$P(n-1) = \left[1 - \frac{P(n-2)}{P(n-2)+R}\right]P(n-2) = \frac{RP(n-2)}{P(n-2)+R} \qquad \text{Equation 15}$$

It follows from Equation 9 that $$\frac{1}{K(n)} = 1 + \frac{R}{P(n-1)} \qquad \text{Equation 16}$$

Substituting Equation 15 into Equation 16 suggests that:

$$\frac{1}{K(n)} = 1 + \frac{P(n-2)+R}{P(n-2)} = 2 + \frac{R}{P(n-2)} \qquad \text{Equation 17}$$

By repeating the above step, the following equation is obtained:

$$\frac{1}{K(n)} = n + \frac{R}{P(0)} \qquad \text{Equation 18}$$

Therefore, the RRO estimator described by Equation 1 and rewritten as Equation 14 is a special case of Equations 9-11 with the choice of the parameters satisfying R/P(0)→0. R/P(0)→0 implies that either R→0 or P(0)→∞. R→0 means that the noise variance is close to zero. This implies that the NRRO in PES is close to zero. Obviously, this assumption is incorrect because of the existance of NRRO in a disc drive. When the estimation error covariance is chosen such that P(0)→∞, it is shown from Equation 9-11 that the learning factor of the first iteration K(1)→1, and therefore $\hat{x}(1)$→PES(1). This means that for the first RRO estimate, the estimated RRO equals to measured PES. In disc drives, typically about 40-60% of PES components are NRRO. Hence choosing the initial condition P(0)→∞ is not adequate.

An advantage of the new RRO estimation algorithm is that the estimator gain K(n) in Equation 10 is optimally chosen based on statistical information developed in past manufacturing history of similar disc drives. The statistical information utilized includes statistical information of NRRO. In disc drives, the NRRO distribution is measurable and consistent over different tracks, heads (even different drives). When such information is utilized, better RRO estimates are obtained.

The noise covariance R can be determined through the following steps:

(i) Select a track, and collect a number of revolutions of PES (for example, 100 revolutions of PES).
(ii) Calculate RRO using the averaging method of Equation 1.
(iii) Calculate the standard derivation $\sigma_{RRO}$ and $\sigma_{NRRO}$ of RRO and NRRO, respectively.
(iv) Calculate the NRRO-to-RRO ratio (NRR), NRR=$\sigma_{NRRO}/\sigma_{RRO}$.
(v) Select other tracks at the disc inner diameter (ID), middle diameter (MD) and outer diameter (OD) and repeat the above (i)-(iv) to obtain $NRR_i$ at different tracks.
(vi) The noise covariance R of the drive can be calculated by $$R\left[\frac{1}{q}\sum_{i=1}^{q} NRR_i\right]^2 \qquad \text{Equation 19}$$

with q being the number of tested tracks.

The initial conditions $\hat{x}(0)$ and P(0) can be selected based on the following guidelines:

(a) In disc drives, there is a large amount of coherent RRO existing on adjacent tracks. $\hat{x}(0)$ may be set as the RRO estimate of adjacent tracks. If this information is not available, $\hat{x}(0)$ can be simply set as zero.
(b) For a fast convergence of RRO estimation, P(0) should be chosen based on the NRRO-to-RRO ratio and the initial state $\hat{x}(0)$. In general, if there is little confidence in the accuracy of the initial state, a large P(0) should be chosen.

The above described Kalman filter algorithm (Equations 9-11) was implemented in RRO estimator 330 of the present invention and RRO estimation tests were conducted on discs dives with different NRR values. To implement the Kalman filter algorithm, procedure (i)-(vi) presented above was used for determining noise covariance R, and guidelines (a)-(b) above were used for selecting $\hat{x}(0)$ and P(0).

Case 1: RRO Estimation for a Disc Drive with NRR Close to 1.

In the test disc drive the measured standard derivations of NRRO and RRO are 2.1% and 2.14% of track pitch, respectively. The true NRRO-to-RRO ratio is NRR=2.1/2.14=0.96. Hence, the best choice of noise covariance R should be 0.96. In order to test the robustness of the new Kalman filter algorithm, it is assumed that the true NRR is not known. Only a roughly estimated value is available. In this test, values of R=1.1 and P(0)=2 were used.

Figure 4:
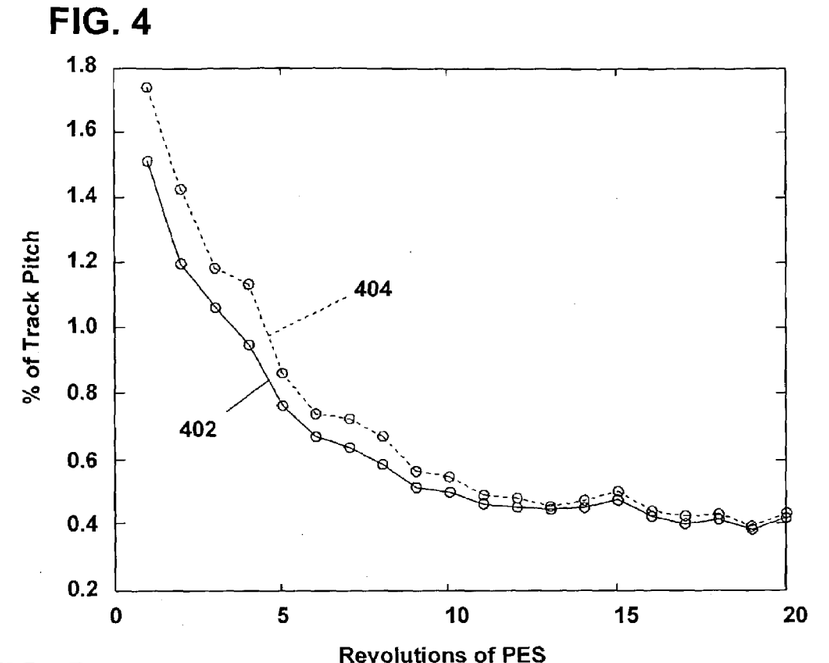
FIGS. 4-9 are plots illustrating results obtained by employing a RRO estimation technique and the RRO estimation technique of the present invention.

FIG. 4 is a comparison of plots of RRO estimation results obtained using the RRO estimation technique (described by Equation 1) and the new Kalman filter technique of the present invention (described by Equations 9-11). The vertical axis represents RRO as a percentage of track pitch and the horizontal axis represents revolutions of PES. From FIG. 4, it is clear that the RRO estimate obtained using the new technique (plot 402) is smaller than the RRO estimate obtained using the algorithm (plot 404).

Figure 5:
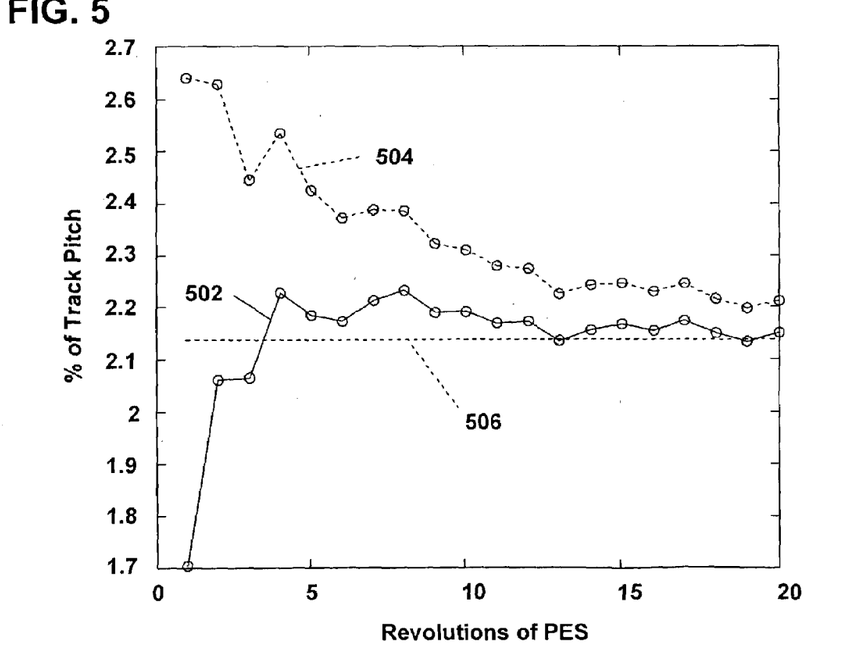

FIG. 5 includes plots showing the standard deviation of the true RRO (plot 506), the standard deviation of the RRO estimated using the new estimation technique (plot 502) and the standard deviation of the estimated RRO using the estimation technique (plot 504). The vertical axis represents RRO as a percentage of track pitch and the horizontal axis represents revolutions of PES. From FIG. 5, it is clear that the new estimation technique provides a faster convergence of the standard deviation of the RRO than the old technique.

Figure 6:
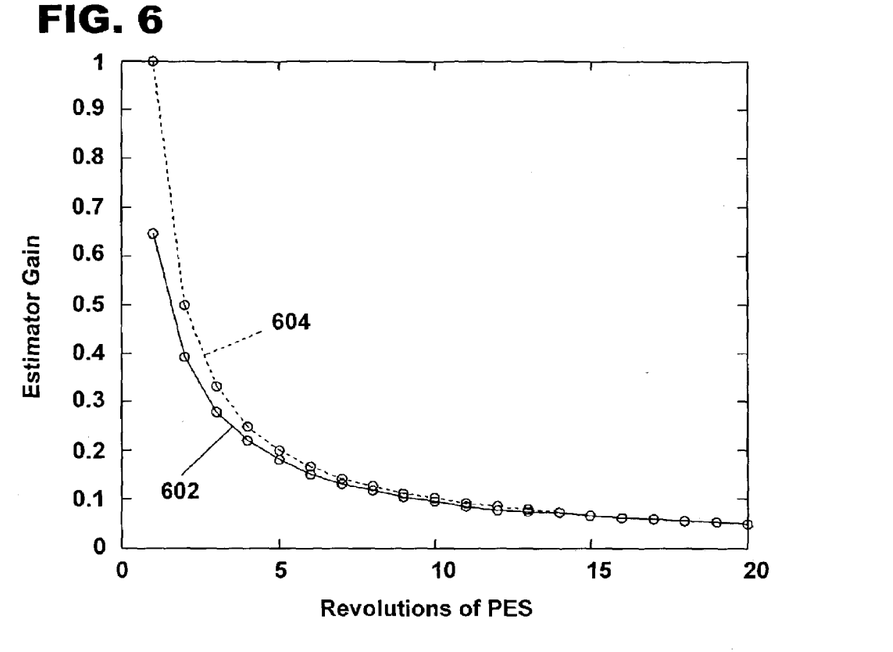

FIG. 6 includes plots of the learning gain of the RRO estimation technique (plot 604) and the new RRO estimation technique (plot 602). The vertical axis represents the estimation gain and the horizontal axis represents revolutions of PES. FIG. 6 indicates that the new algorithm has a small estimator gain at the beginning of the estimation process. As the number of PES revolutions increases, both estimator gains are substantially similar.

Case 2: RRO Estimation for a Disc Drive with NRR Close to 1.

In this case the test disc drive includes a servo loop that employs a compensation table for RRO errors to cause about a 50% RRO reduction. Therefore, the standard derivation of RRO is about 1.07% of track pitch. The standard deviation of NRRO is the same as in case 1. Consequently, the true NRR=1.96 in this case and therefore the ideal noise covariance R should be 3.85. As in case 1, the true NRR is assumed to be unknown and a value of R=3 is used. Since it is known that the RRO is small and the NRR is large, a relatively high initial noise covariance P(0)=3 is employed.

Figure 7:
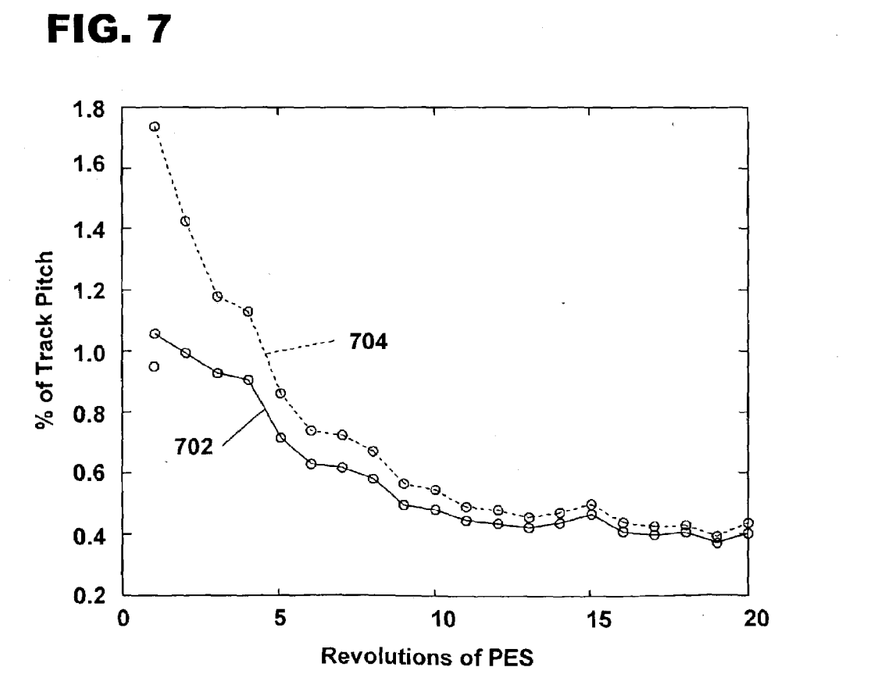
Figure 8:
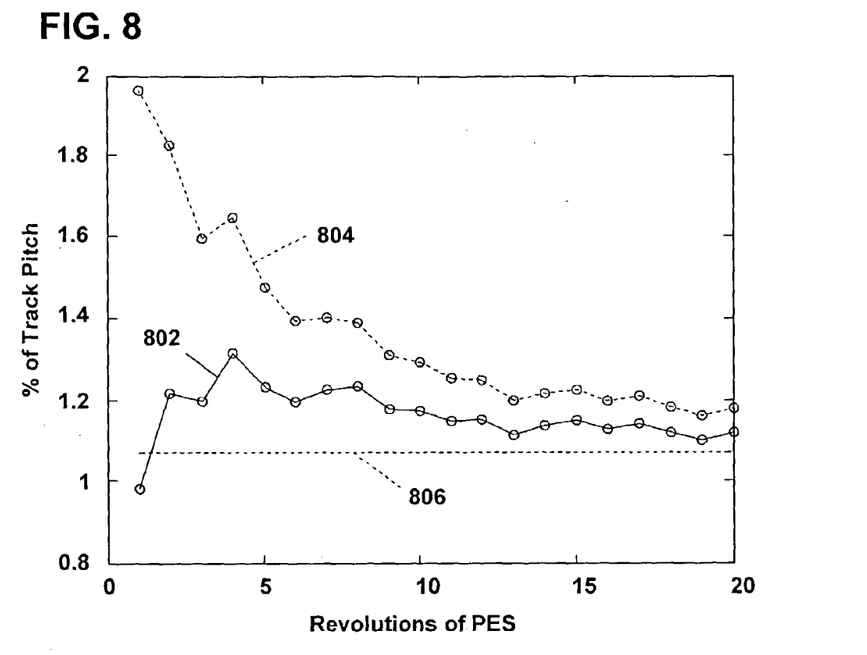
Figure 9:
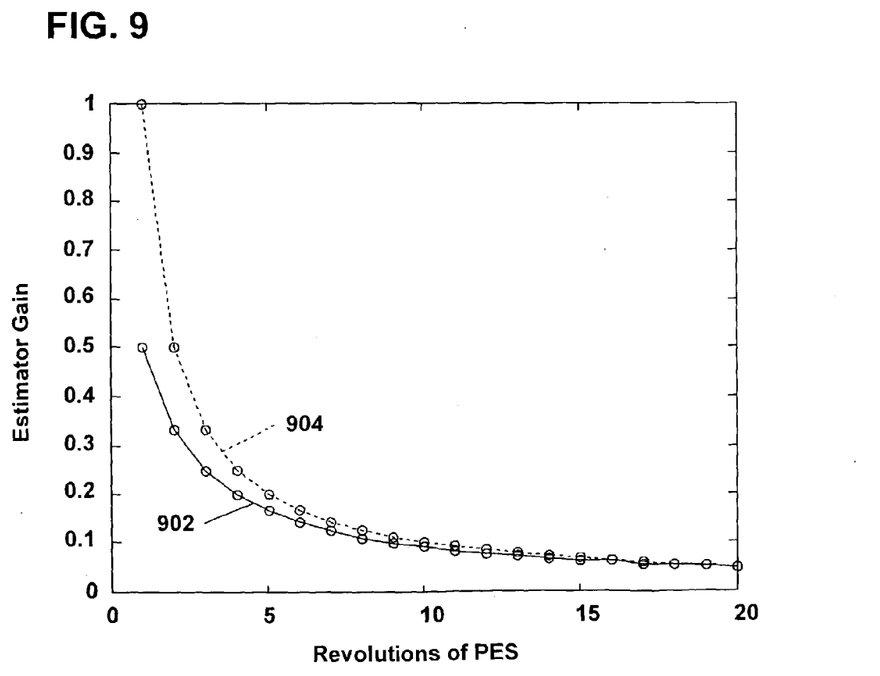

The experiments carried out in Case 1 are repeated for the disc drive in Case 2 and similar plots are obtained. In FIGS. 7-9, plots 702, 802 and 902 represent the new technique, plots 704, 804 and 904 represent the old technique and plot 806 is a plot showing the standard deviation of the true RRO. FIGS. 7 and 8 show that for a small number of PES revolutions, the RRO estimation error obtained using the method is very large due to high NRRO components in the PES. Comparing FIGS. 6 and 9, it is seen that when NRR is large, the estimator gain of the new estimation algorithm decreases, while the method does not have a mechanism to adjust the learning rate.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the servo control system while maintaining substantially the same functionality without departing from the scope and spirit of the present invention. In addition, although the preferred embodiment described herein is directed to an RRO estimation system for a disc drive servo loop, it will be appreciated by those skilled in the art that the teachings of the present invention can be applied to other servo control systems, without departing from the scope and spirit of the present invention. Further, the RRO estimator may be implemented in hardware or software. The disc drive can be based upon magnetic, optical, or other storage technologies and may or may not employ a flying slider.

What is claimed is:

1. An apparatus for estimating repeatable runout in a servo control system, the apparatus comprising:
    a stochastic state estimator, which utilizes deterministic and random signal characteristics of a position error signal and receives position error signals from the servo control system and estimates the signal characteristics repeatable runout in the position error signals.

2. The apparatus of claim 1 wherein the stochastic state estimator includes a linear stochastic model of repeatable runout and non-repeatable runout.

3. The apparatus of claim 1 wherein the stochastic state estimator estimates the repeatable runout based on statistical information developed in past manufacturing history.

4. The apparatus of claim 3 wherein the statistical information developed in past manufacturing history includes statistical information of non-repeatable runout.

5. The apparatus of claim 4 wherein the statistical information of non-repeatable runout is utilized to calculate noise covariance, which is utilized by the stochastic state estimator to estimate the repeatable runout.

6. The apparatus of claim 1 further comprising an output device configured to output the estimated repeatable runout from the stochastic state estimator.

7. The apparatus of claim 6 wherein the estimated repeatable runout output by the output device is expressed as a percentage of track pitch.

8. The apparatus of claim 6 wherein the estimated repeatable runout output by the output device is expressed in micro inches relative to a track center line.

9. The apparatus of claim 6 wherein the stochastic state estimator is a Kalman filter.

10. The apparatus of claim 6 wherein the output device includes a memory configured to store the estimated repeatable runout output.

11. A method of estimating repeatable runout in a servo control system, the method comprising:
    providing a stochastic state estimator, which utilizes deterministic and random signal characteristics of a position error signal and that receives position error signals from the servo control system and estimates the repeatable runout in the position error signals.

12. The method of claim 11 wherein the stochastic state estimator includes a linear stochastic model of repeatable runout and non-repeatable runout.

13. The method of claim 11 wherein the stochastic state estimator estimates the repeatable runout based on statistical information developed in past manufacturing history.

14. The method of claim 13 wherein the statistical information developed in past manufacturing history includes statistical information of non-repeatable runout.

15. The method of claim 14 wherein the statistical information of non-repeatable runout is utilized to calculate noise covariance, which is utilized by the stochastic state estimator to estimate the repeatable runout.

16. The method of claim 11 further comprising providing an output device that outputs the estimated repeatable runout from the stochastic state estimator.

17. The method of claim 16 wherein the estimated repeatable runout output by the output device is expressed as a percentage of track pitch.

18. The method of claim 16 wherein the estimated repeatable runout output by the output device is expressed in micro inches relative to a track center line.

19. The method of claim 16 wherein the stochastic state estimator is a Kalman filter.

20. An apparatus for estimating repeatable runout in a servo control system, the apparatus comprising:
    a stochastic state estimation means, which utilizes deterministic and random signal characteristics, for characteristics of a position error signal for receiving position error signals from the servo control system and for estimating the repeatable runout in the position error signals; and
    an output device configured to output the estimated repeatable runout from the stochastic state estimation means.

* * * * *

UNITED STATES PATENT AND TRADEMARK OFFICE
CERTIFICATE OF CORRECTION

PATENT NO. : 7,330,331 B2
APPLICATION NO. : 10/455029
DATED : February 12, 2008
INVENTOR(S) : Tao Zhang It is certified that error appears in the above-identified patent and that said Letters Patent is hereby corrected as shown below:

Column 7, lines 43-47

Equation, 19, delete " $R\left[\dfrac{1}{q}\sum_{i=1}^{q}NRR_i\right]^2$ " and insert -- $R=\left[\dfrac{1}{q}\sum_{i=1}^{q}NRR_i\right]^2$ --.

Column 9
Line 24, delete "signal characteristics".

Column 10
Line 38, delete "characteristics, for".

Signed and Sealed this

Twenty-ninth Day of July, 2008

JON W. DUDAS
*Director of the United States Patent and Trademark Office*